United States Patent [19]
Dawson et al.

[11] 3,755,797
[45] Aug. 28, 1973

[54] ELECTRICAL INFORMATION STORE

[75] Inventors: John Dawson, Colin Bunting, both of Nottingham, England

[73] Assignee: Plessey Handel Und Investments A.G., Zug, Switzerland

[22] Filed: Mar. 28, 1972

[21] Appl. No.: 238,880

[30] Foreign Application Priority Data

Apr. 13, 1971 Great Britain ..................... 9,285/71

[52] U.S. Cl. .......................................... 340/174 PC
[51] Int. Cl. ......................... G11c 11/06, G11c 7/00
[58] Field of Search ....................... 340/174 PC, 173

[56] References Cited

UNITED STATES PATENTS

| | | | |
|---|---|---|---|
| 2,768,367 | 10/1956 | Rajchman | 340/174 PC |
| 3,582,909 | 6/1971 | Booker | 340/173 |
| 3,503,053 | 3/1970 | Sanders | 340/174 PC |

*Primary Examiner*—Stanley M. Urynowicz, Jr.
*Attorney*—Samuel Scrivener, Jr., N. Douglas Parker, Jr. et al.

[57] ABSTRACT

An electrical information store, capable of storing one binary digit despite interruption of power, which includes two magnetic storage cores having a common write circuit, the cores being read one at a time alternately, a core which has been read being re-written before the other core is read.

1 Claim, 2 Drawing Figures

ELECTRICAL INFORMATION STORE

The invention relates to electrical information stores and is particularly concerned with the retention of stored information in the event of failure of electrical power.

It is known to use a bistable device to store a binary digit of information. If the bistable device is a toggle, a continuous output signal is available to indicate the state of the toggle. But after a power failure, it is fortuitous whether the toggle assumes the state it was in at the moment of failure. On the other hand, if the bistable device is a magnetic core, the core maintains its state in the event of a power failure. But a core has to be read on every occasion on which it is desired to ascertain its state. And if a digit is read from the core, the digit must be rewritten in the core since the reading process is destructive. The use of cores is consequently cumbersome and slow.

According to the invention there is provided an electrical information store, capable of storing one binary digit of information, which includes two magnetic storage cores; a write circuit common to both cores energisable in response to an input signal to write in both cores a digit to be stored in the store; a toggle operable to deliver a sustained output signal in response to the reading of a stored digit from either one of the cores; and sequencing means effective to read the cores one at a time alternately, and to apply the store output signal to the common write circuit between each core reading operation.

Since both cores are operated to indicate a stored digit, and since the cores are read one at a time alternately, there is always at least one core in the operated state, despite the fact that the core reading operation is destructive. The toggle output is sustained until the toggle reverts to its unoperated state on the application of an erase signal to the store. By delivering a sustained output signal, which may be employed as and when required, the toggle separates the use of the output signal from the reading and writing processes associated with the cores. This is advantageous in designing circuits which use the toggle output, especially if the circuits are integrated circuits carried on an integrated circuit chip.

Figure 1:
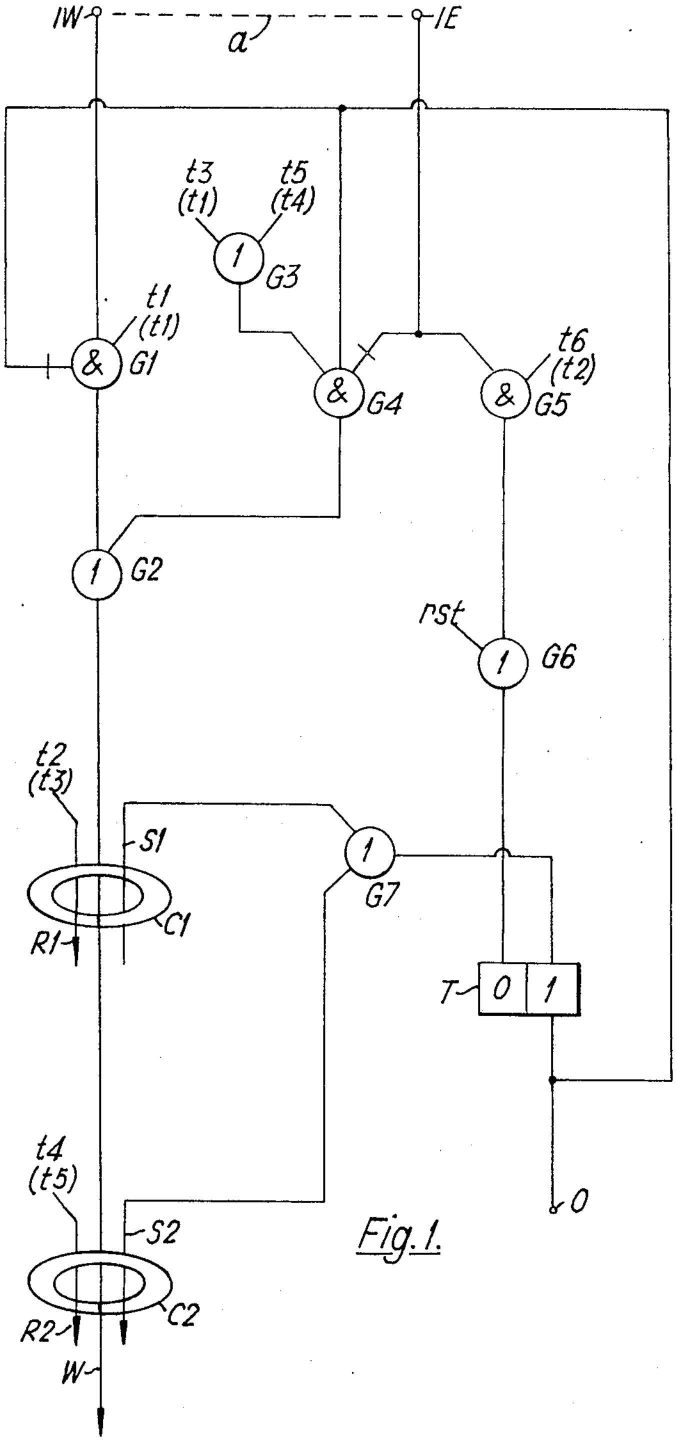

The invention will now be described with reference to the accompanying drawings in which:

FIG. 1 is a schematic diagram of a store according to the invention, and

Figure 2:
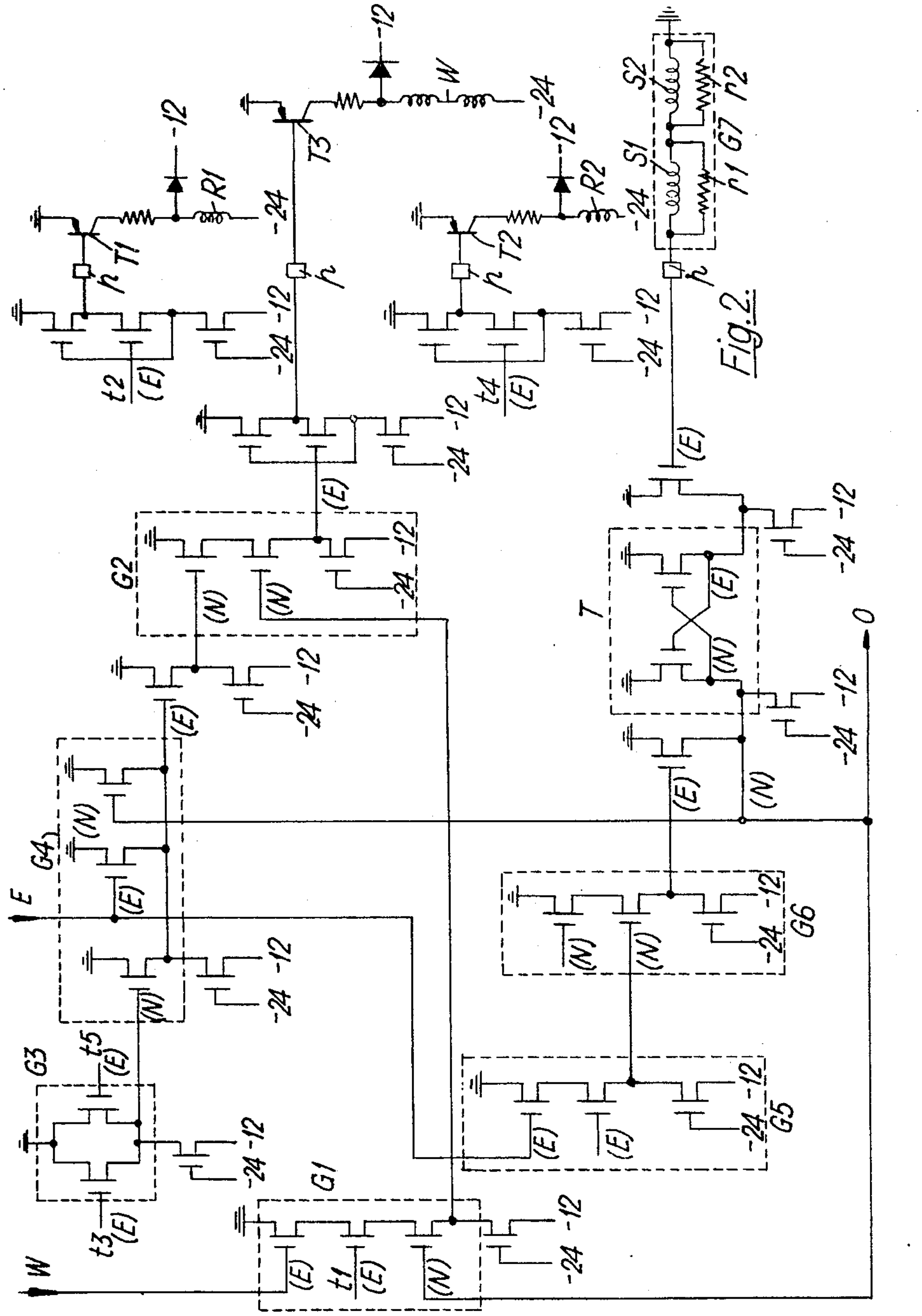

FIG. 2 is a circuit diagram showing the use of metal oxide silicon transistors in the provision of the toggle and sequencing means, As shown in FIG. 1, the store includes two magnetic storage cores C1, C2. A write terminal IW is connected by gates G1, G2 to write circuit W serving both the cores. The cores have individual reading circuits R1, R2 and individual sense windings S1, S2. The sense windings are connected to an OR gate G7, whose output operates a toggle T. When operated, the toggle T delivers an output signal at an output terminal 0. The output signal is also applied to a gate G4, and is used additionally to inhibit the gate G1. The gate G4 receives an input from an OR gate G3. The output of the gate G4 is applied to the gate G2. An erase signal applied to an erase terminal IE is used to inhibit the gate G4, and is also delivered to a gate G5. The outlet of the gate G5 is connected to an OR gate G6, to which a reset pulse *rst* can be delivered. The output of the gate G6 is used to set the toggle T to its unoperated state. The connection between the terminals IW, IE represented by the broken line *a*, and the references shown in brackets should be ignored at this stage.

Initially, both the cores C1, C2 are in the "0" state. Power is then supplied to the circuitry. This is followed by a reset pulse *rst*, which opens the gate G6 and sets the toggle T to the "0" state if it is not already in this state. The time pulses *t1* – *t6* are then delivered, the pulses recurring in a repetitive cycle. The gate G3 opens ineffectively at pulses *t3*, *t5*. The other pulses are ineffective. The pulses *t2*, *t4* are ineffective because both the cores C1, C2 are in the "0" state.

To store a binary information digit in the store, an input signal is applied to the write terminal IW. At the first subsequent time pulse *t1*, the gate G1 opens, followed by the gate G2, energising the common write circuit W and switching both cores tp the "1" state. The time pulse *t2* energises the read circuit R1 and restores the core C1 to the "0" state, generating a signal in the sense winding S1 which opens the gate G7 and operates the toggle T. With the toggle T operated, an output signal is delivered at the output terminal 0, the gate G1 is inhibited, and the gate G4 is primed. The time pulse *t3* opens the gate G3, followed by the gates G4, G2, energising the common write circuit W. The core C1 is returned to the "1" state, the core C2 remaining in the "1" state. The time pulse *t4* energises the read circuit R2 and restores the core C2 to the "0" state, generating a signal in the sense winding S2 which opens the gate G7. The opening of the gate G7 is ineffective because the toggle T is already operated. The time pulse *t5* opens the gate G3, followed by the gates G4, G2, energising the common write circuit W. The core C2 is returned to the "1" state, the core C1 remaining in the "1" state. The time pulse *t6* then appears ineffectively at the gate G5.

During the next and subsequent time cycles, the output of the toggle T inhibits the gate G1, so that the time pulse *t1* is ineffective whether or not the input signal has been withdrawn from the write terminal IW. The pulse *t2* switches the core C1, opening the gate G7 ineffectively. The pulse *t3* returns the core C1 to the "1" state. The pulse *t4* switches the core C2, opening the gate G7 ineffectively. The pulse *t5* returns the core C2 to the "1" state. The pulse *t6* appears ineffectively at the gate G5.

To erase the stored digit, an erase signal is applied to the erase terminal IE. This may be applied at any time in the time cycle. Its immediate effect is to inhibit the gate G4, and to prime the gate G5. The erase signal has a duration equal to the sum of one time cycle and one pulse width. The inhibiting of the gate G4 prevents the energising of the write circuit W by the pulses *t3*, *t5* applied to the gate G3. Hence the cores C1, C2 remain in the "0" state after being switched to the "0" state by the pulses *t2*, *t4* respectively. The time pulse *t6* opens the gate G5, followed by the gate G6, and restores the toggle T, thus terminating the output signal delivered at the output terminal 0, and removing the inhibiting input at the gate G1 and the priming input at the gate G4. The events just described take place at each application of the erase signal to the erase terminal IE, but their sequence varies in accordance with the point in the time cycle at which the erase signal is first applied.

Considering now the question of power failure, the most immediately noticable effect is the loss of the output signal from the toggle T, if the output signal was being delivered at the moment of failure. If the output signal was not being delivered at the moment of failure, there is of course no loss of signal. But in either event it is fortuitous whether, on the resumption of power, the toggle T assumes the state it occupied at the moment of failure.

To overcome this uncertainty, a reset pulse *rst* is applied to the gate G6 immediately after the resumption of power, so that the toggle T is set to the "0" state. Now if, at the moment of failure, no output signal was being delivered by the toggle T, the cores C1, C2 were in the "0" state, and they are still in the "0" state when power is resumed. The time pulses *t1* – *t6* are therefore ineffective and the toggle T remains in the "0" state, as described under the initial conditions mentioned above. But if the toggle T was delivering an output signal at the moment of failure, one or other or both of the cores C1, C2 occupied the "1" state at the moment of failure, depending on the point in the time cycle at which the failure occurred. The state of the cores remains unchanged when power is resumed and the toggle T is set to the "0" state. The time pulses *t1* – *t6* are then applied. In the first time cycle, one or other of the pulses *t2*, *t4* is effective to generate a signal in one or other of the sense windings S1, S2, opening the gate G7 and operating the toggle T. Delivery of the output signal is thereby resumed. Subsequent events are as described above.

The store can be worked a cycle of five time pulses *t1* – *t5* if the pulses are applied as indicated by the bracketed references of FIG. 1. With this arrangement information is written into the store initially at time *t1* and is read out from the cores C1, C2 at the times *t3*, *t5* respectively. Re-writing via the gates G3, G4 G2 takes place at time *t4* in the case of the core C1, and at time *t1* of the next cycle in the case of the core C2 — the gate G1 being by now inhibited. Erasure in response to an erase signal takes place on the opening of the gates G5, G6 at time *t2*.

A further way of working the store is possible. Under these conditions, the five pulse time cycle of the previous paragraph is employed, the write and erase terminals IW, IE are commoned by a conductor *a*, and it is arranged that the input signal applied to the commoned terminals is applied at the time of the pulse *t3* of one cycle and overlaps the pulse *t3* of the next cycle. That is, the duration of the input pulse is the sum of the time cycle and one pulse width. Under these conditions, the first input signal operates the cores C1, C2 and the toggle T, and delivers an output signal at the output terminal 0. The second input signal restores the cores C1, C2 and the toggle T, and terminates the output signal. That is to say, the store responds to input signals to record and erase an information digit alternately, an output signal being delivered to indicate the storage of an information digit.

Application of the input signal to the commoned terminals IW, IE has the following effect:

First Application

The gate G4 is immediately inhibited, rendering the gate G3 ineffective. Since the core C1 is in the "0" state, its read out by pulse *t3* is ineffective. Pulse *t4* is applied ineffectively to gate G3, and the read out of core C2 by pulse *t5* is also ineffective. At time pulse *t1*, the gate G3 again opens ineffectively, but the opening of the gate G1 is followed by that of gate G2 and the switching of the cores C1, C2 to the "1" state. At time pulse *t2*, gates G5, G6 open ineffectively, the toggle T being already in the "0" state. At time pulse *t3*, the read out of core C1 is followed by the opening of gate G7 and the switching of the toggle T to the "1" state, causing an output signal to be delivered at the terminal 0. At the end of the pulse *t3*, the input signal terminates. Pulse *t4* then returns core C1 to the "1" state, via gates G3, G4 G2. Thereafter, the cores C1, C2 are read out and rewritten alternately, the toggle T remaining in the "1" state as described above.

Second Application

The gate G4 is immediately inhibited, rendering the gate G3 ineffective. Pulse *t3* reads out the core C1; gate G7 opens ineffectively, the toggle T being already in the "1" state. The application of pulse *t4* to gate G3 is ineffective and the core C1 remains in the "0" state. Core C2 is read out at time pulse *t5*, the gate G7 again opening ineffectively. Pulse *t1* is ineffective since gates G1, G4 are both inhibited. Core C2 therefore remains in the "0" state. At time pulse *t2*, gates G5, G6 open, switching the toggle T to the "0" state and terminating the output signal delivered at the terminal 0. At time pulse *t3*, the read out of core C1 is ineffective, since the core is in the "0" state. At the end of the pulse *t3*, the input signal terminates. The stored binary digit has now been erased, no output signal being delivered at the terminal 0. The application of further time pulses is ineffective until the next input signal is received.

A circuit showing how metal oxide silicon transistors (Mosts) may be used in the realisation of the toggle and sequencing means of the store is shown in FIG. 2. The Mosts are provided on an integrated circuit chip, from which connection to discrete electrical components is made by means of pads *p*. In the circuit of FIG. 2, Mosts are used both actively as switching agents and passively as resistive agents. Mosts which perform the gating functions discussed in FIG. 2 are enclosed in broken lines, the gate references of FIG. 2 being used again in FIG. 3. The letters E, N in brackets denote earth and negative polarities respectively and indicate the polarity of various points in the circuit in the absence of signals applied to the circuit and in the interval between two time pulses. The circuit is shown working with a six-pulse time cycle. Three potentials are used, namely earth, −12 volts and −24 volts. Among the discrete components are the read windings R1, R2 of the cores C1, C2, which are in series respectively with transistors T1, T2, whose base potentials are controlled by time pulses *t2*, *t4* respectively. The write windings of the cores C1, C2 and a transistor T3 are connected in series in the common write circuit W. The base potential of the transistor T3 is controlled by the output of the gate G2. The gate G7 is realised by connecting the sense windings S1, S2 of the cores C1, C2 in series with each other, the windings being shunted by resistors *r1*, *r2* respectively. The operation of the circuit will now be apparent from the description given in connection with FIG. 1. What is claimed is:

1. An electrical information store for storing one binary digit of information, which includes two magnetic storage cores; a write circuit common to both cores, means to energize said write circuit in response to an input signal to write in both cores a digit to be stored in the store; a toggle, said toggle coupled to the output of each core and responsive to the reading of a stored digit from either one of the cores for delivering a sustained output signal; and sequencing means effective to read the cores one at a time alternately, and to apply the sustained output signal to the common write circuit between each core reading operation.

* * * * *